United States Patent
Fuse

(10) Patent No.: US 8,633,727 B2
(45) Date of Patent: Jan. 21, 2014

(54) POWER GENERATION SYSTEM AND SENSING SYSTEM

(75) Inventor: Kenichi Fuse, Hadano (JP)

(73) Assignee: Empire Technology Development LLC, Wilmington, DE (US)

( * ) Notice: Subject to any disclaimer, the term of this patent is extended or adjusted under 35 U.S.C. 154(b) by 521 days.

(21) Appl. No.: 12/968,984

(22) Filed: Dec. 15, 2010

(65) Prior Publication Data

US 2011/0234256 A1    Sep. 29, 2011

(30) Foreign Application Priority Data

Mar. 29, 2010    (JP) ................................ 2010-075351

(51) Int. Cl.
*G01R 31/34*    (2006.01)

(52) U.S. Cl.
USPC ............... 324/765.01; 324/764.01; 324/177; 290/55; 290/27; 290/28; 290/47; 290/48; 418/132 A; 418/132 B

(58) Field of Classification Search
USPC .................................................... 324/765.01
See application file for complete search history.

(56) References Cited

U.S. PATENT DOCUMENTS

| 4,589,259 | A | * | 5/1986 | Boutto et al. | 60/698 |
| 5,040,948 | A | * | 8/1991 | Harburg | 416/85 |
| 5,744,871 | A | * | 4/1998 | Akesolo | 290/55 |
| 6,081,043 | A | * | 6/2000 | Akesolo | 290/55 |
| 6,523,781 | B2 | * | 2/2003 | Ragner | 244/153 R |
| 7,872,365 | B2 | * | 1/2011 | Rourke | 290/53 |
| 8,209,973 | B1 | * | 7/2012 | Frich | 60/398 |
| 2007/0152450 | A1 | * | 7/2007 | Chiu | 290/54 |
| 2009/0250938 | A1 | * | 10/2009 | Stone, Jr. | 290/55 |

FOREIGN PATENT DOCUMENTS

JP    2007-093342    4/2007

OTHER PUBLICATIONS

Taira Hiroshi Hayami "Age of Electricty, local production for local consumption, "Vibration Power Generator" is?" Nippon Jitsugyo Publishing [online: http://www.njg.co.jp/kongetsu_tokushu.php?itemid=1371].

Windhp Beginners Introduction to Wind Power "Except for wind turbine power generation using wind power" Dec. 16, 2008 [Online http://windhp.seesaa.net/article/111301162.html].

* cited by examiner

*Primary Examiner* — Tung X Nguyen
*Assistant Examiner* — Thang Le
(74) *Attorney, Agent, or Firm* — Maschoff Brennan

(57) ABSTRACT

A power generation system includes a support unit configured to support a power transmission line disposed on a transmission line tower, and a power generation unit. The support unit includes a support line having an end part connected to the power transmission line and a rotary body configured to rotate in a manner cooperating with the support line. The power generation unit is configured to generate electric power in response to rotation of the rotary body caused by movement of the support line resulting from tension of the power transmission line.

20 Claims, 6 Drawing Sheets

POWER GENERATION SYSTEM AND SENSING SYSTEM

CROSS-REFERENCE TO RELATED APPLICATIONS

This application claims priority to Japanese Patent Application No. 2010-075351 filed Mar. 29, 2010, which is incorporated herein by reference in its entirety.

TECHNICAL FIELD

Embodiments disclosed herein relate to a power generation system and a sensing system.

BACKGROUND

As a countermeasure against global warming, power generation systems using natural energy such as wind power are attracting great attention.

Some power generation systems using wind power include a wind mill rotated by wind such that a torque of the wind mill drives a power generation motor to generate electric power. Other power generation systems using wind power include a piezoelectric element attached to a board vibrated by wind such that vibrations of the board deform the piezoelectric element to generate electric power. See "Wind power generation, Introduction for beginners", [online], [Search: Mar. 25, 2010], <URL: http://windhp.seesaa.net/article/111301162.html>.

However, the foregoing power generation systems using wind mills or vibrating boards have many problems. For instance, when newly installing such power generation systems, an installation site must be selected. Additionally, it is costly to install the wind mill or the vibrating board.

SUMMARY OF THE INVENTION

A power generation system according to embodiments disclosed herein includes a support unit supporting a power transmission line disposed on a transmission line tower, a power generation unit and a power storage unit. The support unit includes a support line having an end part connected to the power transmission line, and at least one immovable pulley and at least one movable pulley rotating in a manner cooperating with the support line. The movable pulley is provided with a movement unit causing the movable pulley to move so as to return the support line to an initial position thereof while resisting tension of the power transmission line. The power generation unit includes at least one power generation motor coupled to a rotating shaft of any of the immovable pulley and the movable pulley. The power generation motor generates electric power when the tension of the power transmission line causes the support line to move from the initial position relative to the movable pulley. The power storage unit stores electric power generated by the power generation unit.

Another power generation system according to embodiments disclosed herein includes a support unit supporting a power transmission line disposed on a transmission line tower and a power generation unit. The support unit includes a support line having an end part connected to the power transmission line, and a rotary body rotating in a manner cooperating with the support line. The power generation unit generates electric power when tension of the power transmission line causes the support line to move from an initial position thereof relative to the rotary body.

In some embodiments disclosed herein, the rotary body is a movable pulley, and the movable pulley is provided with a movement unit causing the movable pulley to move so as to return the support line to the initial position while resisting the tension of the power transmission line.

In some embodiments disclosed herein, an action unit is disposed in the other end part of the support line, the action unit causing the support line to return to the initial position while resisting the tension of the power transmission line.

In some embodiments disclosed herein, the power generation unit includes a power generation motor coupled to a rotating shaft of the rotary body.

In some embodiments disclosed herein, the power generation unit may include: a connection unit disposed on the support line and configured to move when the support line performs relative movement; and a piezoelectric element configured to generate electric power when deformed by the movement of the connection unit.

In some embodiments disclosed herein, a power generation system may include multiple rotary bodies. The rotary bodies may include at least one immovable pulley and at least one movable pulley.

In some embodiments disclosed herein, a power generation system may further include a power storage unit storing electric power generated by the power generation unit.

A sensing system according to embodiments disclosed herein includes the above power generation system and a sensor apparatus, disposed on a transmission line tower, receiving electric power generated by the power generation system.

DETAILED DESCRIPTION

Embodiments disclosed herein will be described with reference to the figures showing example embodiments for implementing the present invention. The following description includes an example in which two immovable pulleys and one movable pulley are used as a rotary body. The size and the positional relationship of members illustrated in the figures are sometimes exaggerated for the convenience of explanation.

I. First Example Embodiment

Figure 1:
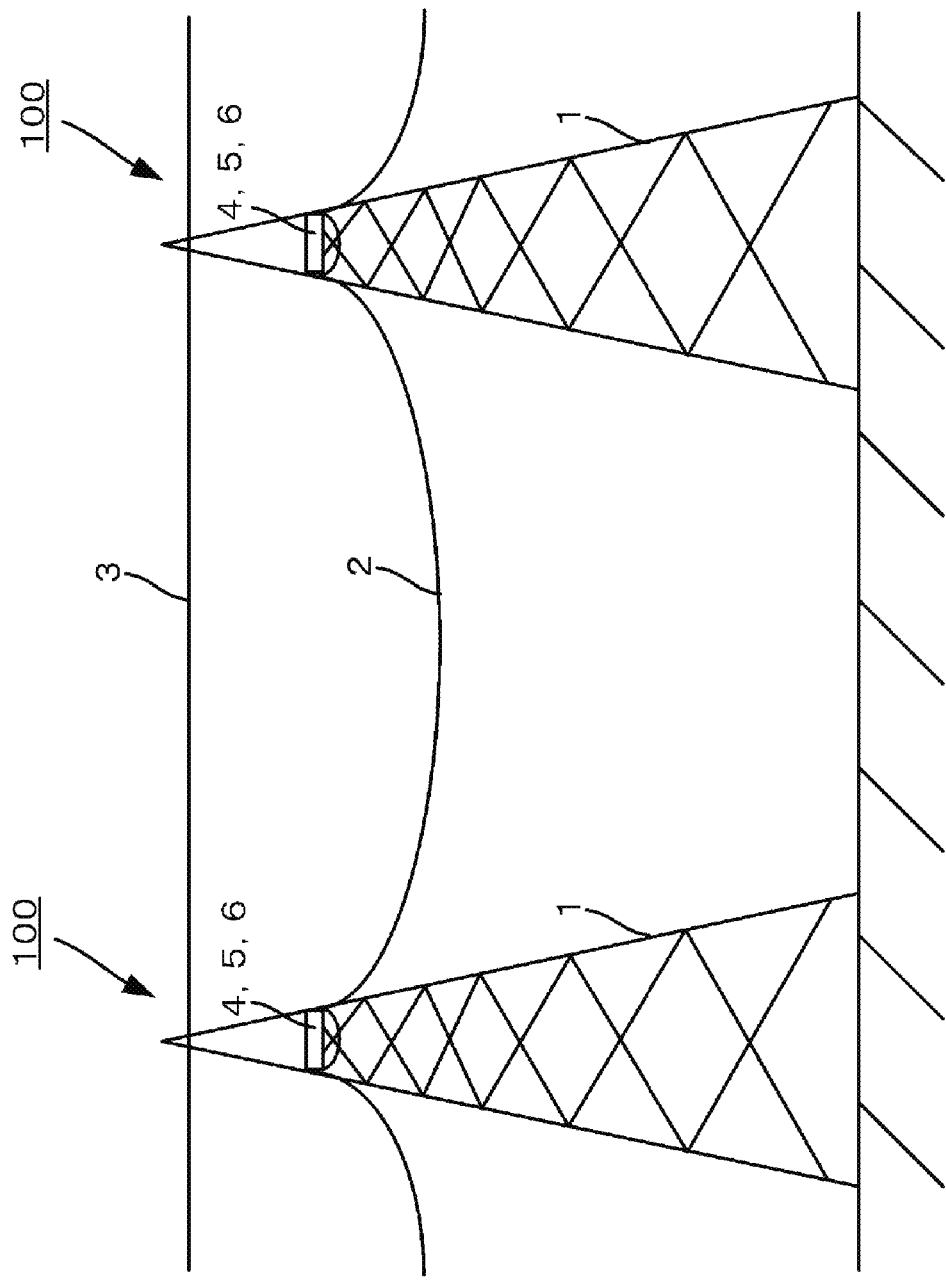
FIG. 1 is a view illustrating an example power generation system using a power transmission line.

FIG. 1 is a view illustrating an example power generation system 100 using a power transmission line.

As illustrated in FIG. 1, the power generation system 100 includes a transmission line tower 1, a power transmission line 2, an overhead ground wire 3, a support unit 4, a power generation unit 5 and a power storage unit 6.

The transmission line tower 1 may include a structure made of iron frames or other suitable material. The transmission line tower 1 is a tower on which the power transmission line 2 is suspended and supported.

The power transmission line 2 is an electric line used to transmit electric power generated by a power generation plant to a power distribution grid. The power transmission line 2 is disposed between the power generation plant and a transformer station and between the transformer station and another transformer station.

The overhead ground wire (GW) 3 is a metal wire used to protect the power transmission line 2 from being struck by lightning. As shown, the overhead ground wire 3 is disposed immediately above the power transmission line 2.

The transmission line tower 1, the power transmission line 2 and the overhead ground wire 3 may include transmission line towers, power transmission lines and overhead ground wires implemented in existing power transmission line facilities.

Figure 2:
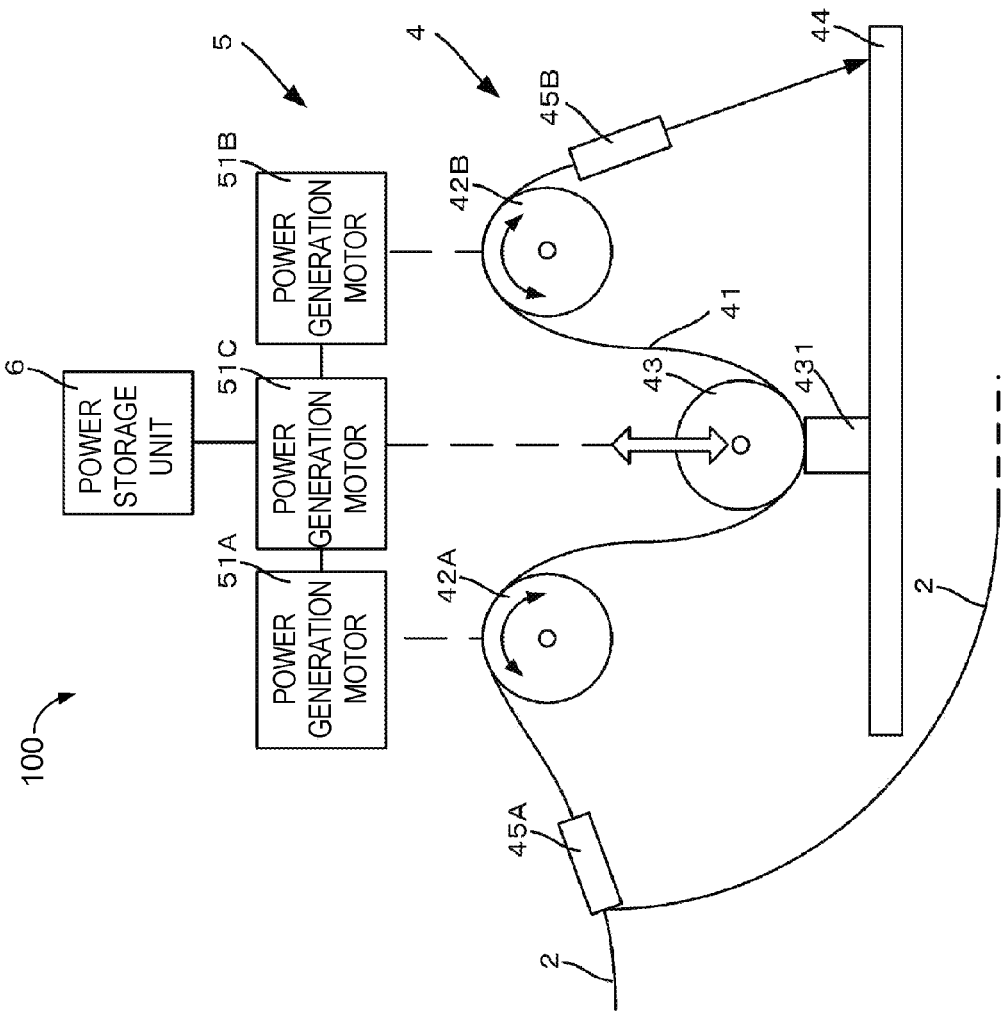
FIG. 2 is a schematic configuration diagram of a power generation system according to a first embodiment.
Figure 3:
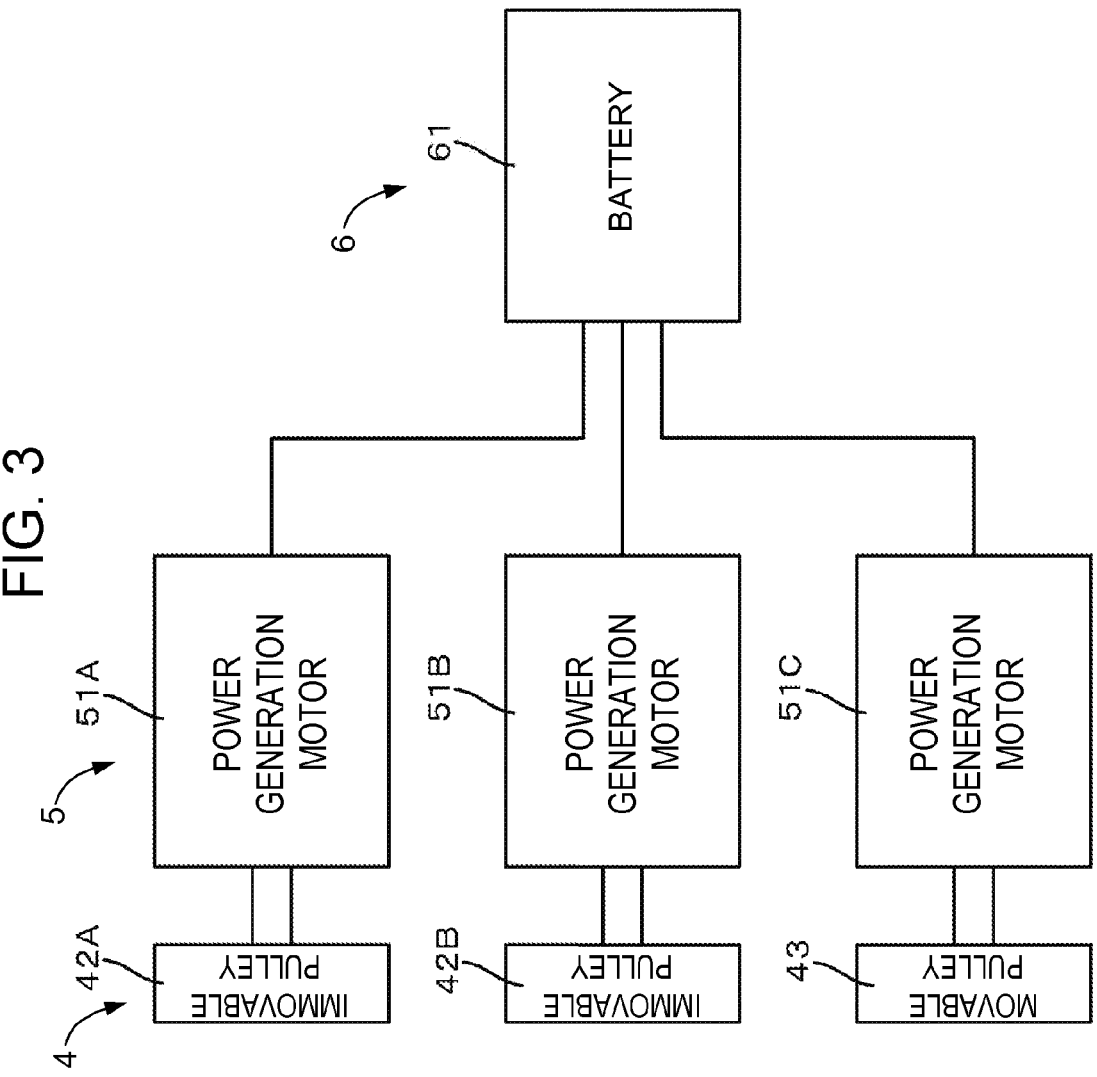
FIG. 3 is a view illustrating a relationship between a rotary body, a power generation unit and a power storage unit of the power generation system of FIG. 2.

The support unit 4, the power generation unit 5 and the power storage unit 6 of power generation system 100 including constituent elements can be added to existing power transmission line facilities and can be arranged as described below. For example, FIG. 2 is a schematic configuration diagram of the power generation system 100 according to some embodiments. FIG. 3 is a view illustrating a relationship between a rotary body, a power generation unit and a power storage unit of the power generation system of FIG. 2.

As illustrated in FIG. 2, the support unit 4 is a section used to support the power transmission line 2 disposed on the transmission line tower 1. The support unit 4 includes a support line 41, immovable pulleys 42A and 42B, a movable pulley 43 and an immovable end section 44.

One end part of the support line 41 is connected to the power transmission line 2. The other end part of the support line 41 is connected to the immovable end section 44. The power transmission line 2 is suspended and supported by the support line 41. An insulator sequence (e.g., multiple insulators) 45A is mounted on the one end part of the support line 41, and the support line 41 is connected through the insulator sequence 45A to the power transmission line 2. An insulator sequence (e.g., multiple insulators) 45B may also be mounted in some embodiments on the other end part of the support line 41, so that support line 41 is connected through the insulator sequence 45B to the immovable end section 44. Here, the shape and the structure of the support line 41 and the insulator sequences 45A and 45B may be similar to those of support lines and insulator sequences used to suspend and support power transmission lines in a typical transmission line tower.

Tension of the power transmission line 2 causes the support line 41 to move from an initial position relative to the immovable pulleys 42A and 42B and the movable pulley 43. The initial position may correspond to the position of the support line 41 when the power transmission line 2 is stationary and not being affected by wind. Detailed descriptions of this relative movement will be given later.

The immovable pulleys 42A and 42B are each a rotary body configured to rotate in a manner cooperating with the support line 41, and fixedly arranged in the support unit 4. Rotating shafts of the immovable pulleys 42A and 42B are respectively coupled to power generation motors 51A and 51B described later.

The movable pulley 43 is a rotary body configured to rotate in a manner cooperating with the support line 41, and disposed in the support unit 4 while keeping a predetermined distance from the immovable pulleys 42A and 42B. The movable pulley 43 may be disposed at a position having a given elevation difference from the arrangement position of the immovable pulleys 42A and 42B. A rotating shaft of the movable pulley 43 is coupled to a power generation motor 51C described later.

In disposing the movable pulley 43 in the transmission line tower 1, the movable pulley 43 is provided with a movement unit 431 (for example, an elastic member such as a spring, or a hydraulic cylinder) configured to cause the movable pulley 43 to return the support line 41 to the initial position while resisting tension of the power transmission line 2. One end part of the movement unit 431 is connected to the movable pulley 43 and the other end part is connected to the immovable end section 44. The support unit 4 may include a slide unit (not shown) configured to cause the movable pulley 43 to slide along a fixed path so that the movable pulley 43 can move primarily in a given direction (for example, vertically).

The immovable end section 44 is a component to which the other end of the support line 41 is coupled so as to be fixed, and may be a part of the transmission line tower 1, for example. The immovable end section 44 is also a component to which the other end of the movement unit 431 is coupled so as to be fixed.

As illustrated in FIG. 3, the power generation unit 5 includes the power generation motors 51A-51C coupled to the rotating shafts of the immovable pulleys 42A and 42B and the movable pulley 43, respectively. Rotation of the immovable pulleys 42A and 42B and the movable pulley 43 causes the power generation motors 51A-51C to generate electric power. The electric power generated is supplied to the power storage unit 6. The power generation motors 51A-51C may include any suitable power generation motor such as, but not limited to, a DC motor or a brushless DC motor.

As further illustrated in FIG. 3, the power storage unit 6 includes a battery 61 storing electric power generated by the power generation motors 51A-51C. The electric power stored in the battery 61 may be used as a power source of a load apparatus such as an apparatus installed on the transmission line tower 1, including an apparatus for detecting transmission line problems, an optical ground wire (OPGW) control apparatus, or the like or any combination thereof. The battery 61 may include any suitable battery, including, but not limited to, a lithium ion battery or a nickel hydride battery.

An operation will now be described by which tension of the power transmission line 2 causes the support line 41 to move from the initial position relative to the immovable pulleys 42A and 42B and the movable pulley 43. As illustrated in FIG. 2, the support line 41 is coiled around the upper end of the immovable pulleys 42A and 42B, and is coiled around the lower end of the movable pulley 43. As such, the immovable pulleys 42A and 42B and the movable pulley 43 rotate in a manner cooperating with each other. The initial position of the support line 41 and the initial position of the movable pulley 43 are set to the position of the support line 41 and the position of the movable pulley 43 when the power transmission line 2 is stationary and not being affected by wind.

When the power transmission line 2 vibrates in response to effects of an action force associated with atmospheric change such as wind, the tension of the power transmission line 2 varies, and the support line 41 is pulled to the side of the power transmission line 2 according to the tension of the power transmission line 2. When the pulling force from the power transmission line 2 is greater than the force (action force) of the movement unit 431 which moves the movable pulley 43 so as to return the support line 41 to the initial position while resisting the tension of the power transmission line 2, the movable pulley 43 moves away from the initial position, and the tension of the power transmission line 2 causes the support line 41 to move from the initial position relative to the immovable pulleys 42A and 42B and the movable pulley 43. In comparison, when the force of pulling the support line 41 is smaller than the action force of the movement unit 431, the movable pulley 43 moves to the initial position, and the tension of the power transmission line 2 is insufficient to prevent the support line 41 from moving back to the initial position relative to the immovable pulleys 42A and 42B and the movable pulley 43.

In this way, when changes in the tension of the power transmission line 2 cause the support line 41 to move to/from the initial position relative to the immovable pulleys 42A and 42B and the movable pulley 43, the immovable pulleys 42A and 42B and the movable pulley 43 rotate in a manner cooperating with each other. As a result, the rotational energy of the immovable pulleys 42A and 42B and the movable pulley 43 is transmitted to the power generation motors 51A-51C coupled to the rotating shaft of each of the pulleys 42A-42B, 43, and electric power is generated. The generated electric power is stored in the battery 61 or provided to a load.

Embodiments of the power generation system 100 can be installed and used with existing transmission line networks spread all over the world. Accordingly, problems associated with selection of an installation site and installation costs can be reduced and/or eliminated compared with a wind mill- or a vibrating board-based power generation system.

In a transmission line tower, various types of sensor apparatuses for monitoring and managing transmission line networks, and/or a sensor apparatus for an OPGW having optical fibers incorporated in the overhead ground wire may be installed. These apparatuses are typically driven using a low voltage of approximately 100 to 200 V. Thus the electric power supplied via the transmission line network cannot be directly used. However, by implementing embodiments of the power generation system 100 disclosed herein, the various types of sensor apparatuses and the OPGW sensor apparatus can be powered by the power generation system 100, thus cutting the cost for installing additional power distribution systems and distribution lines. Further, embodiments of the power generation system 100 may alternately or additionally be used as a power source for various types of sensor apparatuses installed adjacent to the transmission line network that may be used for measurements related to monitoring or the like of climate conditions (for example, temperature, humidity, wind velocity, rain precipitation, snow accumulation, or water volume or situation of a river), and/or for a communication system used to transmit information acquired by the various types of sensor apparatuses. That is, embodiments of the power generation system 100 may also be used in a sensing system including one or more of the above sensor apparatuses.

Power generation systems using natural energy such as wind power are characterized in that the generated electric power varies from hour to hour. However, many power generation systems using natural energy can be coupled together to equalize the total electric power generated and facilitate the maintenance and management thereof. This may be desirable from the viewpoint of a Smart Grid in which power demand is automatically regulated. Thus, by installing multiple power generation systems 100 in many existing transmission line towers and electrically connecting the installed power generation systems 100 to each other, the total electric power that is generated can be equalized; that is, the power generation systems 100 can be used as a system using natural energy suitable for the Smart Grid.

II. Second Example Embodiment

Figure 4:
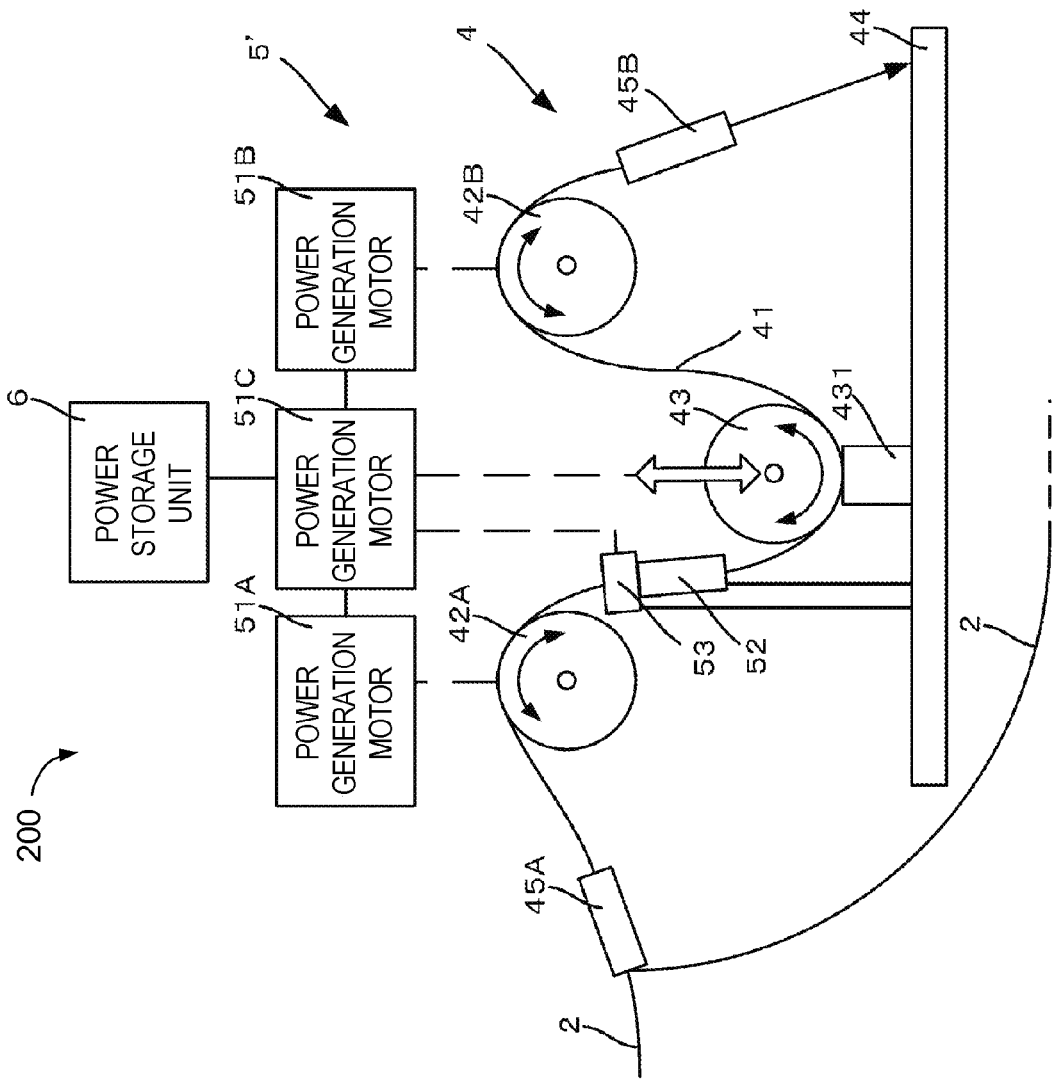
FIG. 4 is a schematic configuration diagram of a power generation system according to a second embodiment.

FIG. 4 is a schematic configuration diagram of a power generation system 200 according to some embodiments. In the power generation system 200 of FIG. 4, some power generation elements are added to the constituent elements of the power generation system 100 described with respect to FIGS. 1-3. In the following description, an explanation is omitted for constituent elements of the power generation system 200 that are similar to those of the power generation system 100.

As illustrated, the power generation system 200 includes a support unit 4, a power generation unit 5', and a power storage unit 6. The power generation unit 5' includes a connection unit 52 and a piezoelectric element 53 configured to be deformed (for example, pressed) by movement of the connection unit 52 so as to generate electric power.

The connection unit 52 is a member, disposed in the support line 41, configured to move in response to relative movement of the support line 41. The connection unit 52 is disposed between the immovable pulley 42A and the movable pulley 43. The connection unit 52 may include a member having a structure and a material allowing deformation of the piezoelectric element 53, including a metal member, a plastic member and a glass member. The connection unit 52 is not limited to the illustrated embodiment in which the connection unit 52 is disposed between the immovable pulley 42A and the movable pulley 43. More generally, the connection unit 52 may be disposed in any part of the support line 41 which performs relative movement. For example, the connection unit 52 may be disposed between the insulator sequence 45A and the immovable pulley 42A.

Figure 5:
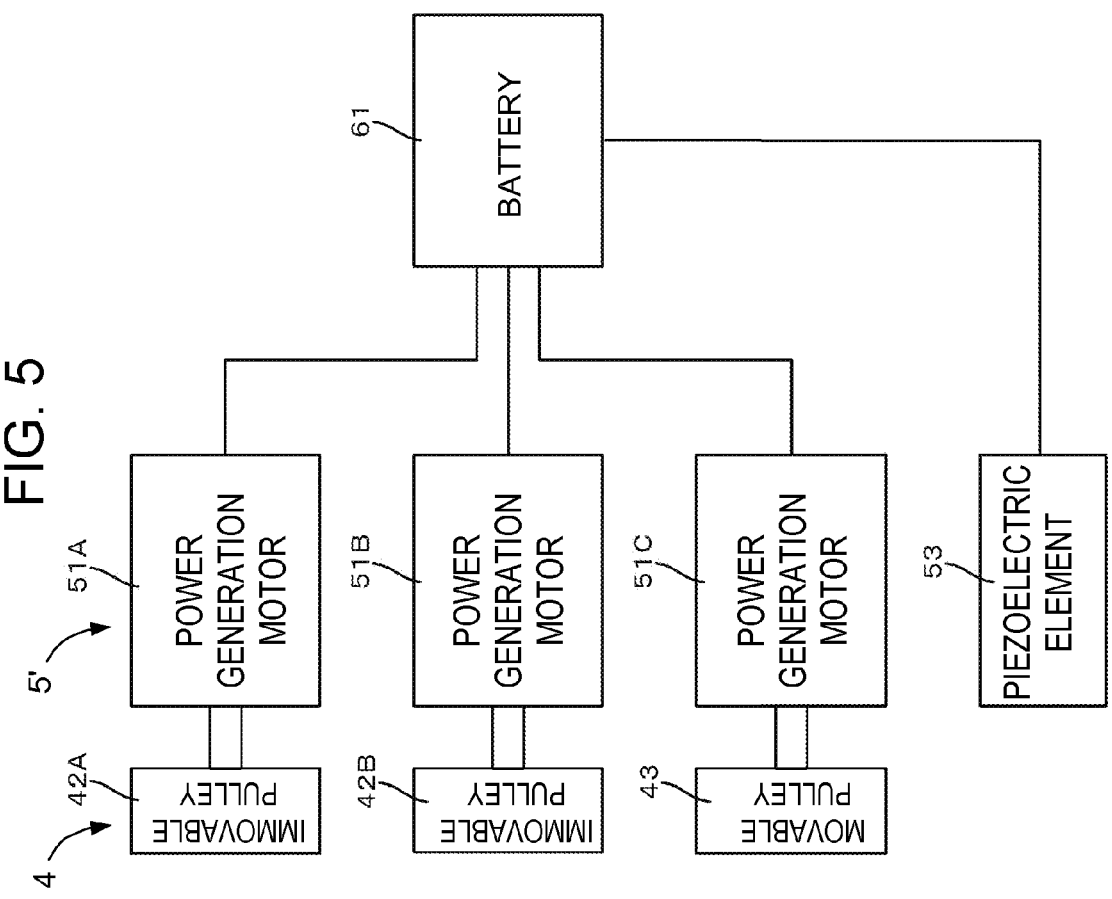
FIG. 5 is a view illustrating a relationship between a rotary body, a power generation unit and a power storage unit of the power generation system of FIG. 4.

The piezoelectric element 53 is an element configured to generate electric power in response to deformation caused by the movement of the connection unit 52. The piezoelectric element 53 may be fixedly disposed, for example, at a place allowing the piezoelectric element 53 to deform in a direction of movement of the connection unit 52 when the connection unit moves. The piezoelectric element 53 may supply, as illustrated in FIG. 5, the generated electric power to the battery 61. In this way, the piezoelectric element 53 is arranged in addition to the power generation motors 51A-51C to increase the conversion efficiency from vibration energy of the power transmission line 2 to power generation energy. The structure and the function of the piezoelectric element 53 may be similar and/or identical to the structure and function of any piezoelectric element now known or later developed.

The connection unit 52 is not limited to being disposed in the support line 41. For instance, the connection unit 52 may be disposed in an end part of the movable pulley 43. When the connection unit 52 is disposed in the movable pulley 43, the piezoelectric element 53 may be fixedly disposed at a place allowing the piezoelectric element 53 to deform, upon movement of the connection unit 52, in a direction of movement of the connection unit 52 moving in response to movement of the movable pulley 43.

III. Alternative Embodiments

The above descriptions are provided by way of example and not limitation. Those skilled in the art will recognize that many modifications, additions or omissions to the above-described embodiments are possible without departing from the spirit and scope of the appended claims.

For example, in the embodiments described above, two immovable pulleys and one movable pulley are used as the rotary body(ies) in the power generation systems 100, 200. However, the present disclosure is not limited thereto; it is sufficient to include at least one rotary body. For example, one movable pulley, or one immovable pulley, or three immovable pulleys and two movable pulleys may be used.

Figure 6:
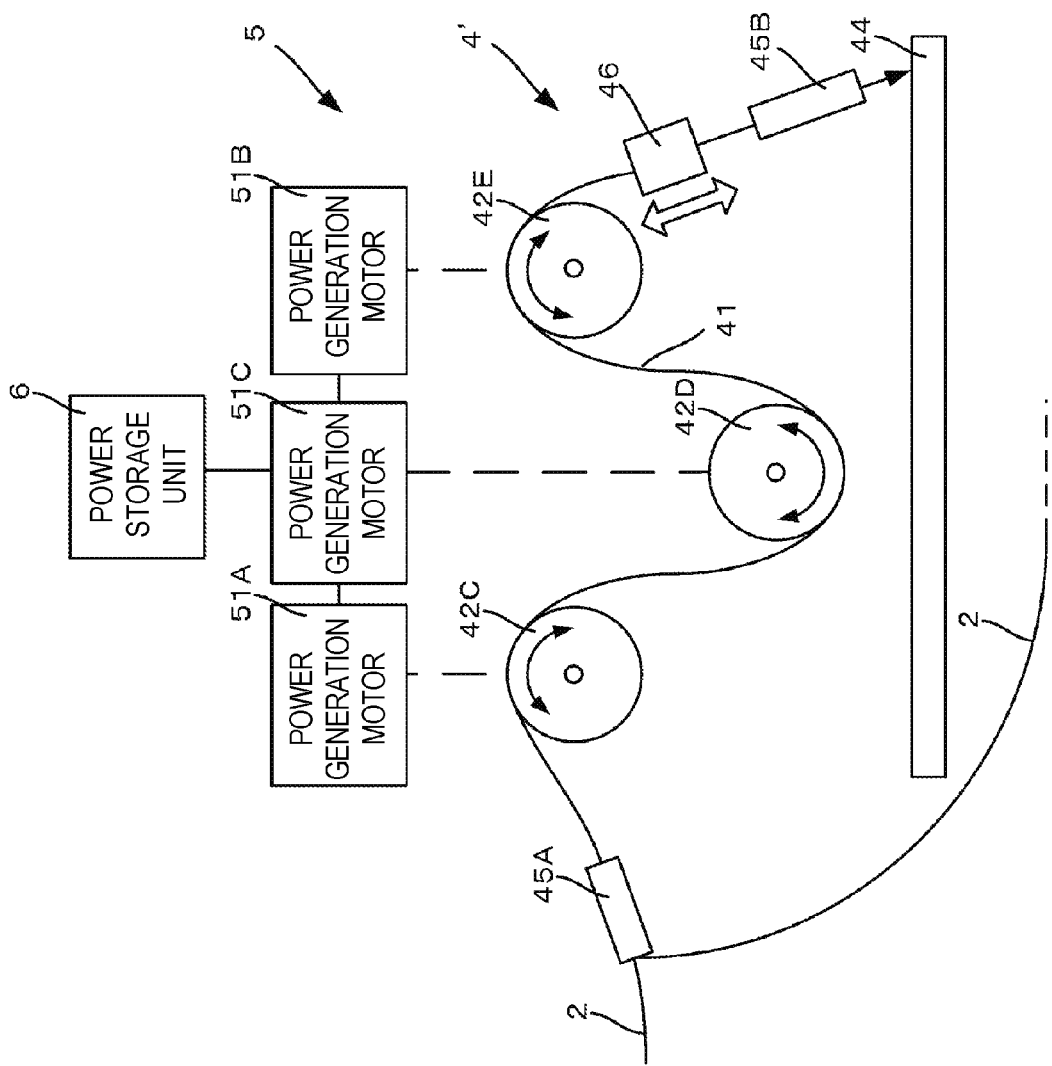
FIG. 6 is a schematic configuration diagram of a variation of the power generation systems of FIGS. 2 and 4.

As another example, FIG. 6 illustrates an embodiment including only immovable pulleys 42C-42E used as the rotary bodies of a support unit 4'. In FIG. 6, an action unit 46 may be disposed at an end of the support line 41. The action unit may include an elastic member such as a spring, or a hydraulic cylinder, configured to cause the support line 41 to return to the initial position while resisting tension of the power transmission line 2.

In some embodiments disclosed herein, power generation motors are coupled to the rotating shaft of each of the pulleys included in the power generation system. However, the present disclosure is not limited thereto. More generally, a power generation motor may be coupled to a rotating shaft of at least one of the immovable and/or movable pulleys of the power generation system. For example, a power generation motor may be coupled only to the rotating shaft of the immovable pulley in some embodiments.

In some embodiments disclosed herein, a power generation motor is used as the power generation unit. In other embodiments, a power generation motor can be omitted while implementing a connection unit and a piezoelectric element.

In some embodiments, a power storage unit stores the electrical power generated by the power generation unit. However, the present disclosure is not limited thereto; the power storage unit may be omitted. In these and other embodiments, the electric power generated by the power generation motor and the like may be used as a power source for various types of sensor apparatuses installed on the transmission line tower 1, for monitoring and managing transmission line networks, or as a power source for an OPGW control device, or the like or any combination thereof.

What is claimed is:

1. A power generation system comprising:
   a support unit supporting a power transmission line disposed on a transmission line tower, the support unit including a support line having an end part connected to the power transmission line, and at least one immovable pulley and at least one movable pulley configured to rotate in a manner cooperating with the support line, wherein the support unit further includes a movement unit configured to cause the movable pulley to move so as to return the support line to an initial position thereof while resisting tension of the power transmission line;
   a power generation unit comprising at least one power generation motor coupled to a rotating shaft of any of the immovable pulley and the movable pulley, wherein the power generation motor is configured to generate electric power when the tension of the power transmission line causes the support line to move from the initial position relative to the immovable pulley and the movable pulley; and
   a power storage unit configured to store electric power generated by the power generation unit.

2. The power generation system of claim 1, wherein the power generation unit further comprises:
   a connection unit disposed on the support line and configured to move when the support line performs relative movement; and
   a piezoelectric element coupled to the connection unit and configured to generate electric power in response to being deformed by the movement of the connection unit.

3. The power generation system of claim 1, wherein the power storage unit comprises a lithium ion battery or a nickel hydride battery.

4. The power generation system of claim 1, wherein the movement unit comprises a spring or a hydraulic cylinder.

5. The power generation system of claim 1, wherein the power generation motor comprises a DC motor or a brushless DC motor.

6. A power generation system comprising:
   a support unit configured to support a power transmission line disposed on a transmission line tower, the support unit including a support line having an end part connected to the power transmission line, and a rotary body configured to rotate in a manner cooperating with the support line; and
   a power generation unit configured to generate electric power in response to rotation of the rotary body caused by movement of the support line resulting from tension of the power transmission line.

7. The power generation system of claim 6, wherein:
   the rotary body includes a movable pulley; and
   wherein the support unit further includes a movement unit configured to cause the movable pulley to move so as to return the support line to the initial position while resisting the tension of the power transmission line.

8. The power generation system of claim 6, wherein the end part of the support line connected to the power transmission line is a first end part, the support line further including a second end part, wherein the support unit further includes an action unit disposed in the second end part of the support line, the action unit configured to cause the support line to return to the initial position while resisting the tension of the power transmission line.

9. The power generation system of claim 8, wherein the action unit comprises a spring or a hydraulic cylinder.

10. The power generation system of claim 6, wherein the power generation unit comprises a power generation motor coupled to a rotating shaft of the rotary body.

11. The power generation system of claim 6 wherein the power generation unit further comprises:
    a connection unit disposed on the support line and configured to move when the support line performs relative movement; and
    a piezoelectric element coupled to the connection unit and configured to generate electric power in response to being deformed by the movement of the connection unit.

12. The power generation system of claim 6, wherein the support unit includes a plurality of rotary bodies.

13. The power generation system of claim 12, wherein:
    the plurality of rotary bodies include at least one immovable pulley and at least one movable pulley; and
    the support unit further includes a movement unit configured to cause the movable pulley to move so as to return the support line to the initial position while resisting the tension of the power transmission line.

14. The power generation system of claim 6, further comprising a power storage unit configured to store the electric power generated by the power generation unit.

15. The power generation system according to claim 14, wherein the power storage unit comprises a lithium ion battery or a nickel hydride battery.

16. A sensing system comprising:
    a power generation system comprising:
       a support unit configured to support a power transmission line disposed on a transmission line tower, the support unit including a support line having an end part connected to the power transmission line, and a rotary body configured to rotate in a manner cooperating with the support line; and a power generation unit configured to generate electric power in response to rotation of the rotary body caused by movement of the support line resulting from tension of the power transmission line; and a sensor apparatus disposed on a transmission line tower and configured to receive power generated by the power generation system.

17. The sensing system of claim 16, wherein the sensor apparatus includes an apparatus configured to detect transmission line problems or an optical ground wire (OPGW) control apparatus.

18. The sensing system of claim 16, wherein the sensor apparatus is configured to be driven using a voltage of approximately 100 to 200 volts.

19. The sensing system of claim 16, wherein the sensor apparatus is configured to make measurements relating to climate conditions or relating to a communication system.

20. The power generation system of claim 16, further comprising a power storage unit configured to store the electric power generated by the power generation unit.

* * * * *

UNITED STATES PATENT AND TRADEMARK OFFICE
CERTIFICATE OF CORRECTION

PATENT NO. : 8,633,727 B2  
APPLICATION NO. : 12/968984  
DATED : January 21, 2014  
INVENTOR(S) : Fuse Page 1 of 1

It is certified that error appears in the above-identified patent and that said Letters Patent is hereby corrected as shown below:

On the Title Page, in Item [56] under "OTHER PUBLICATIONS", in Column 2, Line 1, delete "Electricty," and insert -- Electricity, --, therefor.

In the Specification

Column 6, Lines 38-39, delete "connection unit" and insert -- connection unit 52 --, therefor.

Column 7, Line 6, delete "action unit" and insert -- action unit 46 --, therefor.

In the Claims

Column 8, Line 37, in Claim 11, delete "claim 6" and insert -- claim 6, --, therefor.

Signed and Sealed this  
Twenty-fourth Day of June, 2014

Michelle K. Lee  
*Deputy Director of the United States Patent and Trademark Office*